(12) United States Patent
Sanchez Rola

(10) Patent No.: US 11,520,850 B1
(45) Date of Patent: Dec. 6, 2022

(54) DETERMINING A NUMBER OF SECONDARY TRACKING ATTEMPTS AVOIDED BY BLOCKING A PRIMARY TRACKING DOMAIN FROM LOADING IN A HOST WEB PAGE

(71) Applicant: NortonLifeLock Inc., Tempe, AZ (US)

(72) Inventor: Iskander Sanchez Rola, Antibes (FR)

(73) Assignee: NORTONLIFELOCK INC., Tempe, AZ (US)

( * ) Notice: Subject to any disclaimer, the term of this patent is extended or adjusted under 35 U.S.C. 154(b) by 0 days.

(21) Appl. No.: 17/513,337

(22) Filed: Oct. 28, 2021

(51) Int. Cl.
*H04L 9/40* (2022.01)
*G06F 16/957* (2019.01)
*G06F 16/9535* (2019.01)
*G06F 16/958* (2019.01)

(52) U.S. Cl.
CPC ........ *G06F 16/9577* (2019.01); *G06F 16/958* (2019.01); *G06F 16/9535* (2019.01)

(58) Field of Classification Search
CPC ............... G06F 16/9577; G06F 16/958; G06F 16/9535; H04L 63/10
USPC ........................................................ 715/234
See application file for complete search history.

(56) References Cited

U.S. PATENT DOCUMENTS

| | | | | |
|---|---|---|---|---|
| 7,706,263 | B2* | 4/2010 | Zhou | H04L 51/212 370/235 |
| 8,387,145 | B2* | 2/2013 | Xie | H04L 63/101 726/25 |
| 8,819,817 | B2* | 8/2014 | Croll | G06F 21/62 713/189 |
| 9,160,702 | B2* | 10/2015 | Dempsky | H04L 61/59 |

OTHER PUBLICATIONS

Alexander Fox, The Ultimate Superuser's Guide to uBlock Origin, Published Feb. 25, 2019 via maketecheasier.com, pp. 1-22 (pdf).*

* cited by examiner

*Primary Examiner* — Manglesh M Patel
(74) *Attorney, Agent, or Firm* — Maschoff Brennan

(57) ABSTRACT

Determining a number of secondary tracking attempts avoided by blocking a primary tracking domain from loading in a host web page. In particular, a set of rules that identify numbers of secondary tracking domains that are loaded into web browsers through host web pages by external domain and primary tracking domain combinations may be identified. The set of rules may be created based on loading patterns, resource patterns, parameter patterns, and header patterns exhibited by the external domain and primary tracking domain combinations. The rules may be applied to determine a number of secondary tracking attempts avoided by blocking a primary tracking domain from loading in a host web page.

20 Claims, 6 Drawing Sheets

DETERMINING A NUMBER OF SECONDARY TRACKING ATTEMPTS AVOIDED BY BLOCKING A PRIMARY TRACKING DOMAIN FROM LOADING IN A HOST WEB PAGE

BACKGROUND

Many host web pages that are accessible on the Internet today include content that is provided to the host web page from one or more external domains. Some external domains are configured to load one or more other external domains, which are also configured to load one or more additional external domains. This "domino effect" of external domains loading other external domains can have a variety of negative consequences to host web pages and to the users that visit these web pages. To begin, as more and more external domains are loaded, the load rate of the host web page may decrease significantly. Further, many external domains perform tracking activities, which violate the privacy of users that visit the host web pages where these domains are loaded.

Therefore, blocking applications exist to block certain external domains from loading in host web pages. Most blocking policies do not block all external domains from loading in a web page, as some external domains provide functionality to web pages that, in the absence of the content provided by these external domain, would cause a breakage in the web page. Thus, some blocking policies allow external domains that provide some functionality to host web pages to load, while blocking external domains that perform tracking activities from loading.

Blocking policies may also be configured to count and display a number of tracking domains blocked on each web page visited by a user. Identifying a number of tracking domains blocked is an important metric used to gauge how well a blocking application is working.

Once a tracking domain is blocked, any additional external domains that would have been loaded through the blocked tracking domain are also avoided. The domino effect is terminated and these additional external domains are not loaded. However, while the tracking attempts by these additional external domains are avoided, they are often not included within the number of external domains blocked, since blocking policies do not determine a number of additional tracking domains that a blocked domain is configured to load.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for determining a number of secondary tracking attempts avoided by blocking a primary tracking domain from loading in a host web page may be performed, at least in part, by a computing device including one or more processors. The method may include receiving a set of rules that identify numbers of secondary tracking domains that are loaded into web browsers through host web pages by external domain and primary tracking domain combinations, wherein the set of rules are created based on attribute patterns exhibited by the external domain and primary tracking domain combinations, the set of rules including loading pattern rules based on loading patterns exhibited by the external domain and primary tracking domain combinations, monitoring a first host web page accessed by a user device that loads content from a first external domain, wherein the first external domain is configured to load a first tracking domain and wherein the first external domain and the first tracking domain are among the external domain and primary tracking domain combinations for which attribute patterns were identified to create the set of rules, applying a blocking policy to block the first tracking domain from loading, identifying loading attributes of the first external domain and the first tracking domain, based on the identified loading attributes, identifying a loading pattern rule within the set of rules to dynamically determine a number of first additional tracking domains that would have been loaded by the first tracking domain if the first tracking domain had not been blocked, and displaying the number of first additional tracking domains that would have been loaded by the first tracking domain if the first tracking domain had not been blocked.

In some embodiments, the set of rules may also include resource pattern rules that identify numbers of secondary tracking domains based on content types and size ranges of requests made by the external domain and primary tracking domain combinations. In these embodiments, the method may further include monitoring a second host web page accessed by the user device that loads content from a second external domain, wherein the second external domain is configured to load a second tracking domain and wherein the second external domain and the second tracking domain are among the external domain and primary tracking domain combinations for which attribute patterns were identified to create the set of rules, applying the blocking policy to block the second tracking domain from loading, identifying resource attributes of the second external domain and the second tracking domain, based on the identified resource attributes, identifying a resource pattern rule within the set of rules to dynamically determine a number of second additional tracking domains that would have been loaded by the second tracking domain if the second tracking domain had not been blocked, and displaying the number of second additional tracking domains that would have been loaded by the second tracking domain if the second tracking domain had not been blocked.

In some embodiments, the set of rules may also include parameter pattern rules that identify numbers of secondary tracking domains based on parameters in requests made by the external domain and primary tracking domain combinations. In these embodiments, the method may further include monitoring a third host web page accessed by the user device that loads content from a third external domain, wherein the third external domain is configured to load a third tracking domain and wherein the third external domain and the third tracking domain are among the external domain and primary tracking domain combinations for which attribute patterns were identified to create the set of rules, applying the blocking policy to block the third tracking domain from loading, identifying parameter attributes of the third external domain and the third tracking domain, based on the identified parameter attributes, identifying a parameter pattern rule within the set of rules to dynamically determine a number of third additional tracking domains that would have been loaded by the third tracking domain if the third tracking domain had not been blocked, and displaying the number of third additional tracking domains that would have been loaded by the third tracking domain if the third tracking domain had not been blocked.

In some embodiments, the set of rules may also include header pattern rules that identify numbers of secondary tracking domains based on headers on requests made by the external domain and primary tracking domain combinations. In these embodiments, the method may further include monitoring a fourth host web page accessed by the user device that loads content from a fourth external domain, wherein the fourth external domain is configured to load a fourth tracking domain and wherein the fourth external domain and the fourth tracking domain are among the external domain and primary tracking domain combinations for which attribute patterns were identified to create the set of rules, applying the blocking policy to block the fourth tracking domain from loading, identifying header attributes of the fourth external domain and the fourth tracking domain, based on the identified header attributes, identifying a header pattern rule within the set of rules to dynamically determine a number of fourth additional tracking domains that would have been loaded by the fourth tracking domain if the fourth tracking domain had not been blocked, and displaying the number of fourth additional tracking domains that would have been loaded by the fourth tracking domain if the fourth tracking domain had not been blocked.

In some embodiments, one or more non-transitory computer-readable media may include one or more computer-readable instructions that, when executed by one or more processors of a computing device, cause the computing device to perform a method for determining a number of secondary tracking attempts avoided by blocking a primary tracking domain from loading in a host web page.

In some embodiments, a computing device comprising one or more processors and one or more non-transitory computer-readable media comprising one or more computer-readable instructions that, when executed by the one or more processors, may cause the computing device to perform a method for determining a number of secondary tracking attempts avoided by blocking a primary tracking domain from loading in a host web page.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
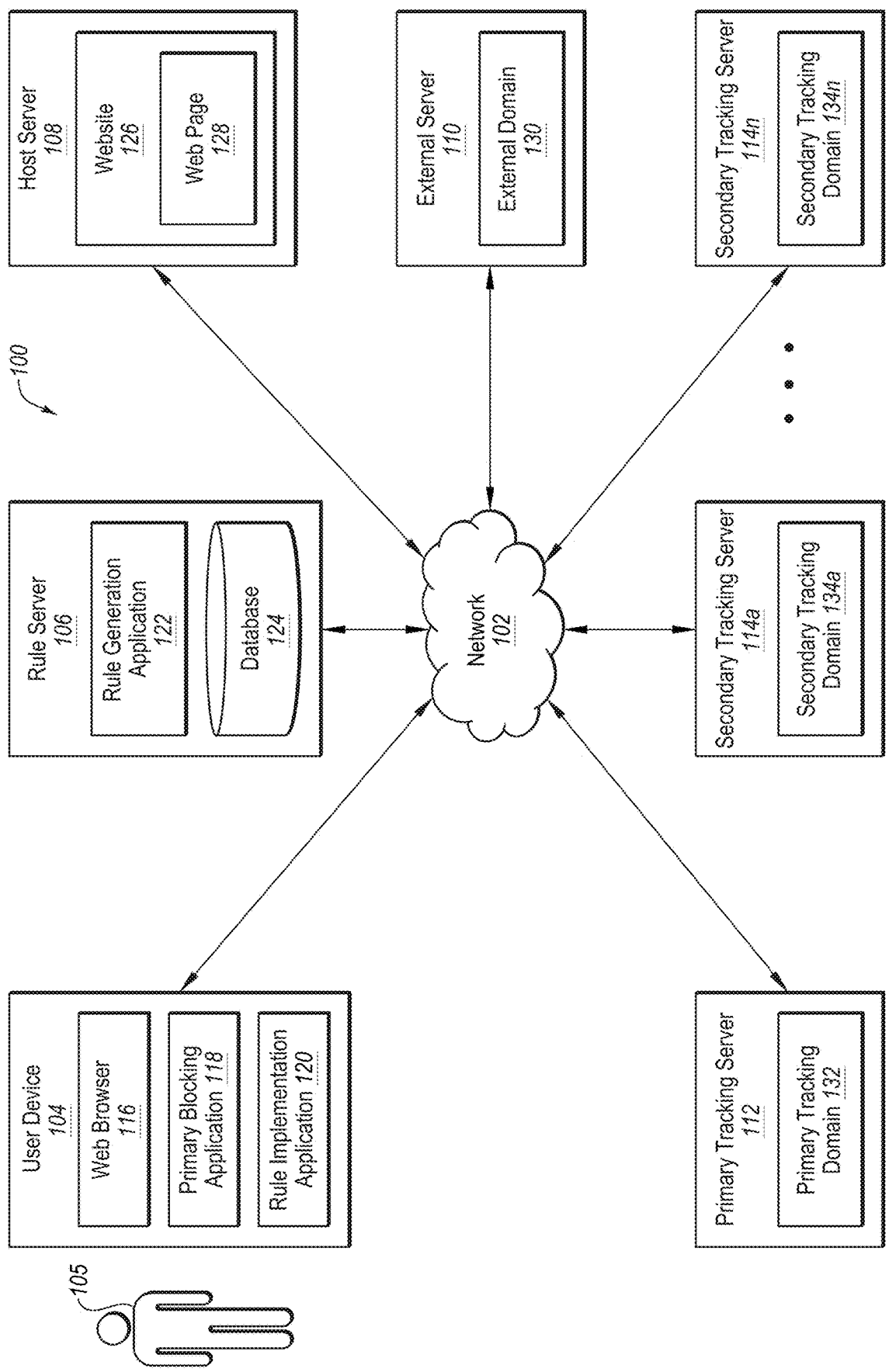
FIG. 1 illustrates an example system configured for determining a number of secondary tracking attempts avoided by blocking a primary tracking domain from loading in a host web page.

Content provided by external (or third-party) domains is included in many host web pages that are accessible on the Internet today. In addition to providing content, these external domains may be configured to load one or more other external domains, which may also be configured to load one or more additional external domains. The "domino effect" caused by external domains loading other external domains can have a variety of negative consequences to host web pages and to the users that visit these web pages. To begin, as more and more external domains are loaded, the load rate of the host web page may decrease significantly. Further, many external domains perform tracking activities, which violate the privacy of users that visit the host web pages where these domains are loaded.

Therefore, blocking applications exist to block certain external domains from loading in host web pages. Most blocking policies do not block all external domains from loading in a web page, as some external domains provide functionality to web pages that, in the absence of the content provided by the external domain, would cause a breakage in the web page. Thus, some blocking policies allow external domains that provide some functionality to host web pages (or "functional domains") to load, while blocking external domains that perform tracking activities (or "tracking domains") from loading.

Blocking policies may also be configured to count and display a number of tracking domains blocked on each web page visited by a user. Identifying a number of tracking domains blocked is an important metric used to gauge how well a blocking application is working.

Once a tracking domain is blocked, any additional external domains that would have been loaded through the blocked tracking domain are also avoided. The domino effect is terminated and these additional external domains are not loaded. However, while the tracking attempts by these additional external domains are avoided, they are often not included within the number of external domains blocked, since blocking policies do not determine the number of additional tracking domains that a blocked domain is configured to load.

For example, in one embodiment, a user may access a host web page that loads content from an external domain. This external domain may not be blocked by a blocking application because, for example, it provides some functionality to the host web page. In addition to loading content on the host web page, the external domain may also be configured to load a tracking domain (hereafter the "primary tracking domain"). This primary tracking domain may be configured to load three addition tracking domains (hereafter "secondary tracking domains). However, the blocking application blocks the primary tracking domain from loading. Because the primary tracking domain is not loaded, the three secondary tracking domains are also avoided. However, the blocking policy counts only the one primary tracking domain as blocked and does not include in the count the three secondary tracking domains that are also avoided.

External domains that load primary tracking domains (or "external domain and primary tracking domain combinations") do not always load the same number of secondary tracking domains. Attribute patterns exhibited by external domain and primary tracking domain combinations may be analyzed to determine a number of secondary tracking attempts that are avoided by blocking the primary tracking domain from loading in a host web page. These attribute patterns exhibited by external domain and primary tracking domain combinations may include loading patterns, resource patterns, parameter patterns, and header patterns. These attribute patterns may be used to create a set of rules, which can be applied to determine a number of secondary tracking attempts that are avoided by blocking a primary tracking domain (within an external domain and primary tracking domain combination) from loading in a host web page.

Some embodiments disclosed herein may enable determining a number of secondary tracking attempts avoided by blocking a primary tracking domain from loading in a host web page. In particular, some embodiments may receive a set of rules that identify numbers of secondary tracking domains that are loaded into web browsers through host web pages by external domain and primary tracking domain combinations. The set of rules may be created based on attribute patterns exhibited by the external domain and primary tracking domain combinations. These attribute patterns may include loading pattern rules that are based on loading patterns exhibited by the external domain and primary tracking domain combinations. These attribute patterns may include resource pattern rules that are based on resource patterns exhibited by the external domain and primary tracking domain combinations. These attribute patterns may include parameter pattern rules that are based on parameter patterns exhibited by the external domain and primary tracking domain combinations. These attribute patterns may include header pattern rules that are based on header patterns exhibited by the external domain and primary tracking domain combinations.

In some embodiments, a host web page that is accessed by a user device may be monitored. The host web page may load content from an external domain that is configured to load a primary tracking domain. The external domain and the primary tracking domain may be among the external domain and primary tracking domain combinations for which attribute patterns were identified to create the set of rules.

A blocking policy may be applied to block the primary tracking domain from loading. Loading, resource, parameter, and header attributes of the external domain and the primary tracking domain may be identified. Based on the identified attributes, a rule may be identified to dynamically determine a number of additional secondary tracking domains that would have been loaded by the primary tracking domain if the primary tracking domain had not been blocked. For example, a loading pattern rule may be identified based on the loading attributes of the external domain and the primary tracking domain. If a loading pattern rule does not exist, a resource pattern rule may be identified based on the resource attributes of the external domain and the primary tracking domain. If a resource pattern rule does not exist, a parameter pattern rule may be identified based on the parameter attributes of the external domain and the primary tracking domain. If a parameter pattern rule does not exist, a header pattern rule may be identified based on the header parameters of the external domain and the primary tracking domain.

Once a rule is identified it may be applied and a number of additional secondary tracking domains that would have been loaded by the primary tracking domain if the primary tracking domain had not been blocked may be displayed.

Turning to the figures, FIG. 1 illustrates an example system 100 configured for determining a number of secondary tracking attempts avoided by blocking a primary tracking domain from loading in a host web page. The system 100 may include a network 102, a user device 104 and an associated user 105, a rules server 106, a host server 108, an external server 110, a primary tracking server 112, and secondary tracking servers 114a-114n.

In some embodiments, the network 102 may be configured to communicatively couple the user device 104, the rules server 106, the host server 108, the external server 110, the primary tracking server 112, and the secondary tracking servers 114a-114n. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
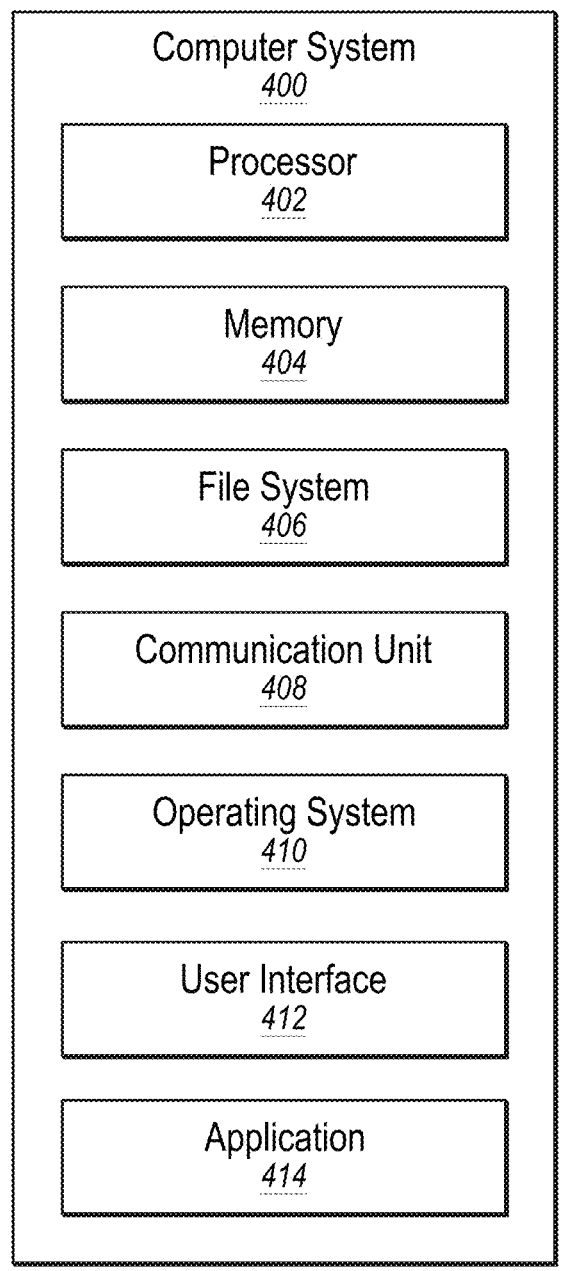
FIG. 4 illustrates an example computer system that may be employed in determining a number of secondary tracking attempts avoided by blocking a primary tracking domain from loading in a host web page.

In some embodiments, the user device 104 may be any computer system capable of communicating over the network 102, examples of which are disclosed herein in connection with the computer system 400 of FIG. 4. In some embodiments, the user device 104 may include a web browser 116. The web browser 116 may enable the user 105 to access third party content, such as websites, over the network 102. In some embodiments, the user device 104 may also include a primary blocking application 118. The primary blocking application 118 may be configured to enforce a policy that blocks one or more external domains from loading content into a host web page that the user 105 visits through the web browser 116. The primary blocking application 118 could be configured in a variety of different ways. For example, the primary blocking application 118 could be configured as an extension or a plugin or an addon to the web browser 116.

In some embodiments the user device 104 may also include a rule implementation application 120. Like the primary blocking application 118, the rule implementation application 120 could be configured in a variety of different ways. For example, the rule implementation application 120 could be configured as an extension or a plugin or an addon to the web browser 116. As provided in more detail hereafter, the rule implementation application 120 may be configured to identify and apply a rule that determines a number of secondary tracking attempts that are avoided by blocking a primary tracking domain from loading in a host web page on the web browser 116.

In some embodiments, the rules server 106 may be any computer system capable of communicating over the network 102, examples of which are disclosed herein in connection with the computer system 400 of FIG. 4. In some embodiments, the rules server 106 may include a rule generation application 122. As provided in more detail hereafter, the rule generation application 122 may be configured to identify and generate a set of rules that may be implemented by the rule implementation application 120 to determine a number of secondary tracking attempts that are avoided by blocking a primary tracking domain from loading in a host web page on the web browser 116. In some embodiments, the rules server 106 may include a database 124. The set of rules generated by the rule generation application 122 may be stored within the database 124.

In some embodiments, the host server 108 may be any computer system capable of communicating over the network 102, examples of which are disclosed herein in connection with the computer system 400 of FIG. 4. In some embodiments, host server 108 may include a host website 126, which may include a host web page 128. The host website 126 and the host web page 128 may be accessed by the user 105 through the web browser 116. The host web page 126 may include content that is loaded from one or more external domains. This content may be loaded in one or more frames in the host web page 128 or in banners that appear at a top, bottom, or along the sides of the host web page 128. Alternatively, the external domains may load content into the host web page 128 by embedding the content directly within the host web page 128.

In some embodiments, the external server 110 may be any computer system capable of communicating over the network 102, examples of which are disclosed herein in connection with the computer system 400 of FIG. 4. In some embodiments, the external server 110 may include an external domain 130. The external server 110 may load content into one or more host web pages, such as web page 128, through the external domain 130. The external domain 130 may also provide some functionality to the host web page(s) on which it loads content. For example, the external domain 130 may provide a media reference, such as a video clip or an audio clip, into a host web page. The external domain 130 may also provide an on-screen tool, such as a site search or chat function to the host web page. The external domain 130 may also provide TV/video streams or radio/audio streams. The external domain 130 may also be configured to load one or more additional external domains.

In some embodiments, the primary tracking server 112 may be any computer system capable of communicating over the network 102, examples of which are disclosed herein in connection with the computer system 400 of FIG. 4. In some embodiments, the primary tracking server 112 may include a primary tracking domain 132. The primary tracking server 112 may be configured to perform tracking activities on web pages where it is loaded. In one embodiment, the external domain 130 may be configured to load the primary tracking domain 132 into the web page 128 and perform tracking activities on the user 105, who visits the web page 128 through the web browser 116.

In some embodiments, secondary tracking servers 114a-114n may be any computer systems capable of communicating over the network 102, examples of which are disclosed herein in connection with the computer system 400 of FIG. 4. In some embodiments, the secondary tracking servers 114a-114n may include secondary tracking domains 134a-134n. In one embodiment, the primary tracking domain 132 may be configured to load one or more of the secondary tracking domains 134a-134n into the web page 128 either directly or indirectly. Like the primary tracking server 112, the secondary tracking domains 134a-134n may be configured to perform tracking activities on the user 105, who visits the web page 128 through the web browser 116.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, the primary blocking application 118 and the rule implementation application 120 may be part of a single application on the user device 104. In another embodiment, the primary blocking application 118 and the rule implementation application 120 may be part of a customized web browser.

Figure 2:
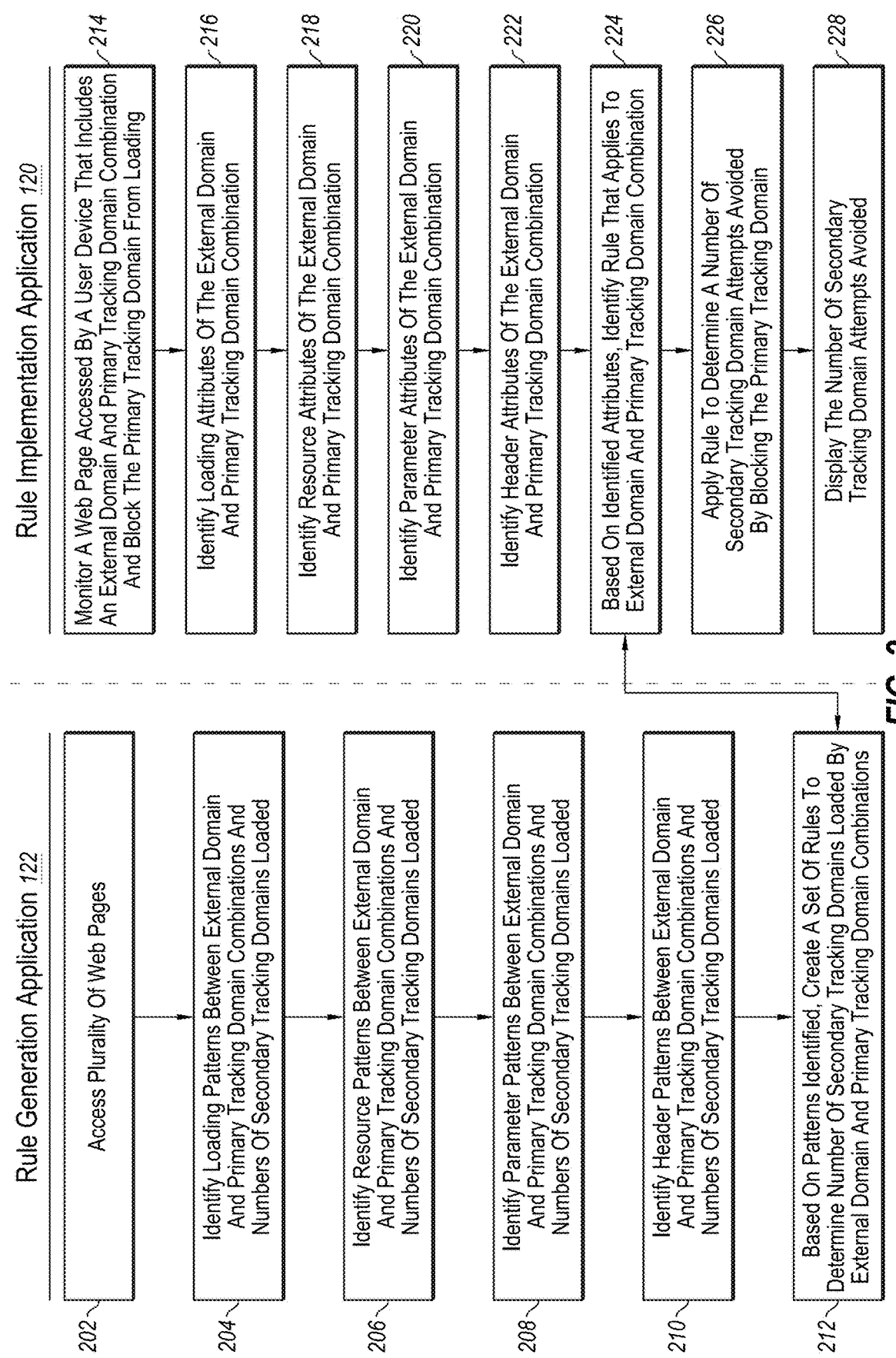
FIG. 2 illustrates the functions that a rule generation application and a rule implementation application are configured to perform.

FIG. 2 illustrates the functions that the rule generation application 122 and the rule implementation application 120 may perform in one exemplary embodiment. In order to generate a set of rules that can be applied to determine a number of secondary tracking attempts that are avoided by blocking a primary tracking domain, the rule generation application 122 may access a plurality of web pages in a first step 202. These web pages may be accessed without the application of any blocking policy so that all external domains that attempt to load content into the web pages are permitted to do so. While not blocked, the rule generation application may identify which external domains are tracking domains that would be blocked if a blocking policy was enforced. The rule generation application 122 may also identify all external domain and primary tracking domain combinations. As used herein, an external domain and primary tracking domain combination may be an external domain that is permitted to load content into a host web page over a blocking policy, and which is configured to load a primary tracking domain that would be blocked by the blocking policy, if enforced.

In a subsequent step 204, the rule generation application 122 may identify loading patterns in the external domain and primary tracking domain combinations. To identify loading patterns, the rule generation application 122 may identify a number of secondary tracking domains that are loaded, either directly or indirectly by each external domain and primary tracking domain combination. If an external domain and primary tracking domain combination loads the same number of secondary tracking domains in at least a threshold percentage of instances, a rule may be created. For example, the threshold may be set at 90% or some other percentage. In this example, if the rule generation application identifies 100 instances of the external domain and primary tracking domain combination, and in 92 of these instances, three secondary tracking domains are loaded, a rule may be created that by blocking the primary tracking domain in the external domain and primary tracking domain combination, three additional secondary tracking domains are also avoided.

Unfortunately, external domain and primary tracking domain combinations do not always load the same number of secondary tracking domains. In some cases, external domain and primary tracking domain combinations may load different numbers of secondary tracking domains. In these cases, additional attribute patterns must be identified in order to determine how many secondary tracking domains are loaded by external domain and primary tracking domain combinations.

In a subsequent step 206, the rule generation application 122 may identify resource patterns in the external domain and primary tracking domain combinations. To identify resource patterns, the rule generation application 122 may analyze the requests/files of the external domains and the primary tracking domains in the external domain and primary tracking domain combinations. In one embodiment, the content types (e.g., javascript, html . . . ) and size ranges of the requests of the external domains and the primary tracking domains may be compared to determine whether there is any correlation between these attributes and a number of secondary tracking domains that are loaded.

For example, a resource pattern may be detected where an external domain that has content type application/javascript and a content-length that is two digits long and loads a primary tracking domain that has a content-type text/html and content-length that is five digits long consistently results in the loading of four additional secondary tracking domains. If the consistency exhibited by this pattern meets or exceeds a threshold, a rule may be created that when this pattern is identified, four additional secondary tracking domains are avoided by blocking the primary tracking domain in the external domain and primary tracking domain combination.

In a subsequent step 208, the rule generation application 122 may identify parameter patterns in the external domain and primary tracking domain combinations. To identify parameter patterns, the rule generation application 122 may analyze the parameters in the requests of the external domains and the primary tracking domains in the external domain and primary tracking domain combinations. Four separate parameter features may be analyzed: parameter names, value types (e.g., numerical, alphabetical . . . ), value length range, and number of parameters included. These features may be compared to determine whether there is any correlation between these features and a number of secondary tracking domains that are loaded.

For example, a parameter pattern may be detected where an external domain or a primary tracking domain that has seven total parameters in a request consistently results in the loading of five additional secondary tracking domains. If the consistency exhibited by this pattern meets or exceeds a threshold, a rule may be created that when this pattern is identified, five additional secondary tracking domains are avoided by blocking the primary tracking domain in the external domain and primary tracking domain combination. In another example, a pattern may be detected that where a primary tracking domain has a parameter with name "partnerID" and a value length that is five digits long consistently results in the loading of six additional secondary tracking domains. If the consistency exhibited by this pattern meets or exceeds a threshold, a rule may be created that when this pattern is identified, six additional secondary tracking domains are avoided by blocking the primary tracking domain in the external domain and primary tracking domain combination.

In a subsequent step 210, the rule generation application 122 may identify header patterns in the external domain and primary tracking domain combinations. To identify header patterns, the rule generation application 122 may analyze the headers in the requests of the external domains and the primary tracking domains in the external domain and primary tracking domain combinations. In one embodiment, information relating to the connection, cache directives, security/privacy practices may be extracted from the headers. This information may be used to determine whether there is any correlation between these features and a number of secondary tracking domains that are loaded.

For example, a pattern may be detected where an external domain or a primary tracking domain with a request header of "access-control-allow-origin: *" (where * is a wildcard) results in the loading of seven additional secondary tracking domains. If the consistency exhibited by this pattern meets or exceeds a threshold, a rule may be created that when this pattern is identified, seven additional secondary tracking domains are avoided by blocking the primary tracking domain in the external domain and primary tracking domain combination.

In a subsequent step 212, the set of rules may be created. This set of rules may be stored in a database that is accessible to the rule implementation application 120.

In a step 214, the rule implementation application 120 may monitor a web page that is accessed by a user device, such as user device 104. The accessed web page may load content from an external domain, which is configured to load a primary tracking domain. The external domain and primary tracking domain combination may be one of the combinations analyzed by the rule generation application 122. The user device 104 may include the primary blocking application 118, which blocks the primary tracking domain from loading.

In a subsequent step 216, the rule implementation application 120 may identify loading attributes of the external domain and primary tracking domain combination. In a subsequent step 218, the rule implementation application 120 may identify resource attributes of the external domain and primary tracking domain combination. In a subsequent step 220, the rule implementation application 120 may identify parameter attributes of the external domain and primary tracking domain combination. In a subsequent step 222, the rule implementation application 120 may identify header attributes of the external domain and primary tracking domain combination.

In a subsequent step 224, the rule implementation application 120 may identify, based on the identified attributes, a rule from the set of rules created by the rule generation application 122 that applies to the external domain and primary tracking domain combination. In a subsequent step 226, the rule implementation application 120 may apply the identified rule to determine a number of secondary domain attempts are avoided by blocking the primary tracking domain. Finally, in a subsequent step 228, the rule implementation application 120 may display the number of secondary tracking domain attempts avoided. In some embodiments, the number of secondary tracking domains avoided may be displayed alone. In other embodiments, the number of secondary tracking domains avoided may be aggregated with a number of primary tracking domains blocked and this aggregated number may be displayed.

By generating the set of rules and identifying a rule that applies to a specific external domain and primary tracking domain combination, a number of additional secondary tracking domains that are avoided by blocking a primary tracking domain may be determined dynamically, or when a user accesses a web page on which the external domain and primary tracking domain combination exists. By identifying this number and displaying it (either alone or aggregated with primary tracking domains blocked), users may be better informed of how many tracking attempts are avoided by the blocking policy enforced by a blocking application.

Although the actions of the rule generation application 122 and rule implementation application 120 are illustrated in FIG. 2 as discrete actions, various actions may be divided into additional actions, combined into fewer actions, reordered, expanded, or eliminated, depending on the desired implementation. For example, in some embodiments, once the rule implementation application 120 identifies attributes for which a rule exists, the other attributes may not be identified. For example, if the rule implementation application identifies a rule based on the resource attributes of the external domain and primary tracking domain combination, there may be no need to identify parameter attributes and header attributes, and steps 220 and 222 may be skipped.

Figure 3A:
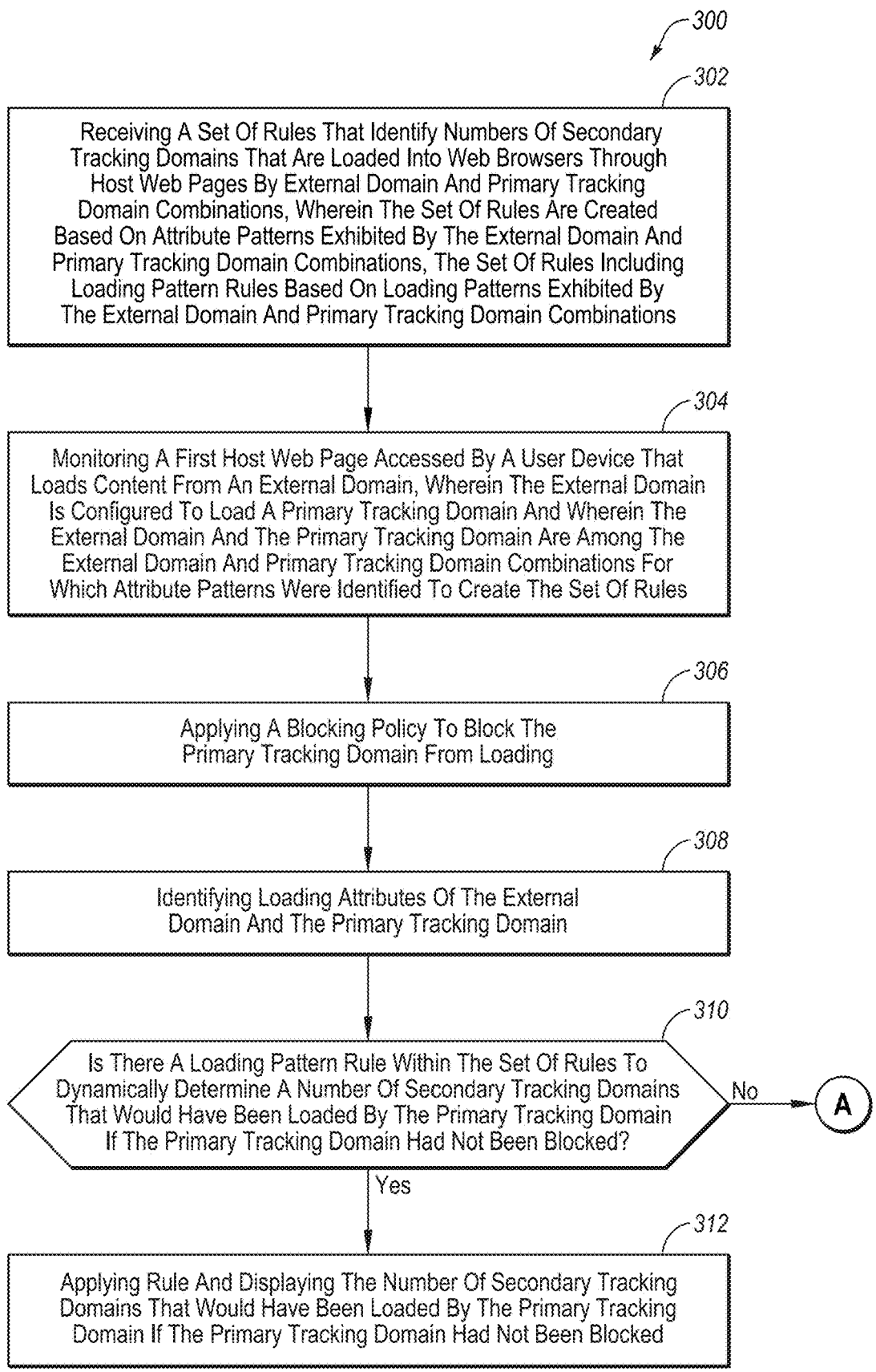
FIGS. 3A-3C are a flowchart of an example method for determining a number of secondary tracking attempts avoided by blocking a primary tracking domain from loading in a host web page.
Figure 3B:
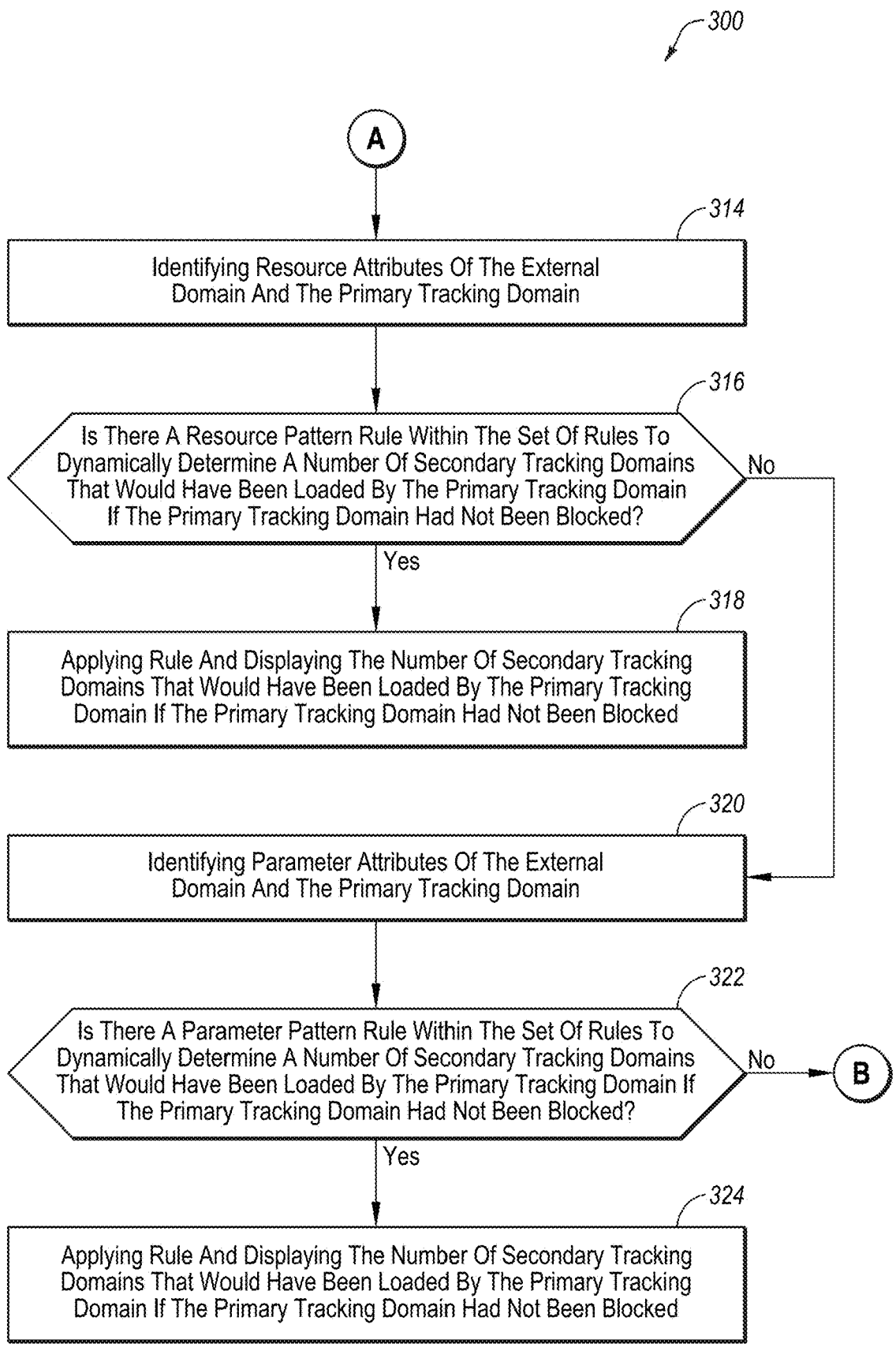
Figure 3C:
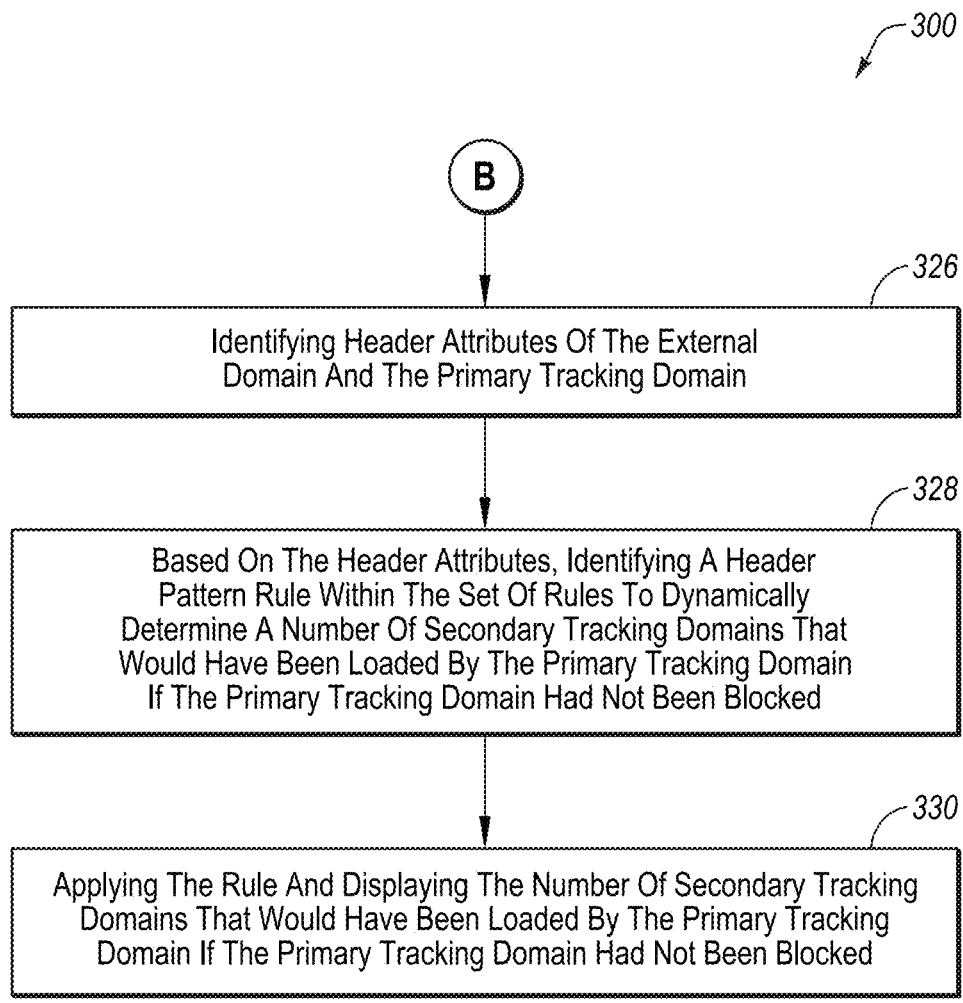

FIGS. 3A-3C are a flowchart of an example method 300 for determining a number of secondary tracking attempts avoided by blocking a primary tracking domain from loading in a host web page. The method 300 may be performed, in some embodiments, by a device or system, such as by the rule generation application 122 and rule implementation application 120. In these and other embodiments, the method 300 may be performed by one or more processors based on one or more computer-readable instructions stored on one or more non-transitory computer-readable media. The method 300 will now be described in connection with FIGS. 1 and 2.

The method 300 may include, at action 302, receiving a set of rules that identify numbers of secondary tracking domains that are loaded into web browsers through host web pages by external domain and primary tracking domain combinations, wherein the set of rules are created based on attribute patterns exhibited by the external domain and primary tracking domain combinations, the set of rules including loading pattern rules based on loading patterns exhibited by the external domain and primary tracking domain combinations. In some embodiments, this step may be performed by an application on a server that is external to a user device. For example, the rule generation application 122 on rules server 106 may perform this step. The loading pattern rules may identify a number of secondary tracking domains that are loaded, either directly or indirectly by each external domain and primary tracking domain combination. If an external domain and primary tracking domain combination consistently loads the same number of secondary tracking domains in at least a threshold percentage of instances, a rule may be created. Alternatively, if an external domain and primary tracking domain combination does not consistently load the same number of secondary tracking domains in at least a threshold percentage of instances, a rule is not created.

The method 300 may include, at action 304, monitoring a host web page accessed by a user device that loads content from an external domain, wherein the external domain is configured to load a primary tracking domain and wherein the external domain and the first primary tracking domain are among the external domain and primary tracking domain combinations for which attribute patterns were identified to create the set of rules. In some embodiments, this step may be performed by an application on a user device. For example, the rule implementation application 120 on user device 104 may perform this step. The user 105 may access the web page 128 through web browser 116. The external domain 130 may load content into the web page 128. The external domain 130 may also be configured to load the primary tracking domain 132. The primary tracking domain 132 may be configured to load one or more of the secondary tracking domains 134a-134n.

The method 300 may include, at action 306, applying a blocking policy to block the first primary tracking domain from loading. For example, the primary blocking application 118 may block the primary tracking domain 132 from loading in web page 128. By blocking the primary tracking domain 132 from loading, the primary blocking application 118 has also avoided tracking attempts by one or more of the secondary tracking domains 134a-134n, which the primary tracking domain 132 is configured to load.

The method 300 may include, at action 308, identifying loading attributes of the external domain 130 and the primary tracking domain 132. Loading attributes of the external domain 130 and the primary tracking domain 132 may simply include an identification of these domains.

The method 300 may include, at action 308, determining whether there is a loading pattern rule within the set of rules to dynamically determine a number of secondary tracking domains that would have been loaded by the primary tracking domain if the primary tracking domain had not been blocked. If there is a loading pattern rule for the external domain 130 and primary tracking domain 132 combination, then the method may include, at action 312, applying the rule and displaying the number of secondary tracking domains 134a-134n that would have been loaded by the primary tracking domain 132 if the primary tracking domain 132 had not been blocked.

Alternatively, if there is not a loading pattern rule within the set of rules to dynamically determine a number of secondary tracking domains that would have been loaded by the primary tracking domain if the primary tracking domain had not been blocked, then the method may include, at action 314, identifying resource attributes of the external domain 130 and the primary tracking domain 132. Resource attributes of the external domain 130 and the primary tracking domain 132 may include the content types (e.g., javascript, html . . . ) and size ranges in the requests of the external domain 130 and the primary tracking domain 132.

The method 300 may include, at action 316, determining whether there is a resource pattern rule within the set of rules to dynamically determine a number of secondary tracking domains that would have been loaded by the primary tracking domain if the primary tracking domain had not been blocked. If there is a resource pattern rule for the external domain 130 and primary tracking domain 132 combination, then the method may include, at action 318, applying the rule and displaying the number of secondary tracking domains 134a-134n that would have been loaded by the primary tracking domain 132 if the primary tracking domain 132 had not been blocked.

Alternatively, if there is not a resource pattern rule within the set of rules to dynamically determine a number of secondary tracking domains that would have been loaded by the primary tracking domain if the primary tracking domain had not been blocked, then the method may include, at action 320, identifying parameter attributes of the external domain 130 and the primary tracking domain 132. Parameter attributes of the external domain 130 and the primary tracking domain 132 may include parameter names, value types (e.g., numerical, alphabetical . . . ), value length range, and number of parameters included in the requests of the external domain 130 and the primary tracking domain 132.

The method 300 may include, at action 322, determining whether there is a parameter pattern rule within the set of rules to dynamically determine a number of secondary tracking domains that would have been loaded by the primary tracking domain if the primary tracking domain had not been blocked. If there is a parameter pattern rule for the external domain 130 and primary tracking domain 132 combination, then the method may include, at action 324, applying the rule and displaying the number of secondary tracking domains 134a-134n that would have been loaded by the primary tracking domain 132 if the primary tracking domain 132 had not been blocked.

Alternatively, if there is not a parameter pattern rule within the set of rules to dynamically determine a number of secondary tracking domains that would have been loaded by the primary tracking domain if the primary tracking domain had not been blocked, then the method may include, at action 326, identifying header attributes of the external domain 130 and the primary tracking domain 132. Header attributes of the external domain 130 and the primary tracking domain 132 may include any information contained within the headers in the requests of the external domain 130 and the primary tracking domain 132.

The method 300 may include, at action 328, based on the header attributes, identifying a header pattern rule within the set of rules to dynamically determine a number of secondary tracking domains that would have been loaded by the primary tracking domain if the primary tracking domain had not been blocked.

The method 300 may include, at action 330, applying the rule and displaying the number of secondary tracking domains 134a-134n that would have been loaded by the primary tracking domain 132 if the primary tracking domain 132 had not been blocked.

The method 300 may thus be employed, in some embodiments, to determine a number of secondary tracking attempts avoided by blocking a primary tracking domain from loading in a host web page. According to the method 300, the number of secondary tracking attempts avoided may be determined without suspending a blocking policy that would allow the primary tracking domain from loading in the host web page. Once determined, this number of secondary tracking attempts may be displayed.

Although the actions of the method 300 are illustrated in FIGS. 3A-3C as discrete actions, various actions may be divided into additional actions, combined into fewer actions, reordered, expanded, or eliminated, depending on the desired implementation. Further, it is understood that the method 300 may improve the functioning of a computer system itself. For example, the user device 104 may be improved by the method 300 by enforcing a blocking policy that blocks the primary tracking domain 132. Primary tracking domain 132, if permitted to load in the web page 128 through the web browser 116, would perform tracking activities on the user 105 resulting in a violation of the privacy of the user 105. In addition, loading speed of the web page 128 would slow if the primary tracking domain 132 was allowed to load content on the web page 128.

Also, the method 300 may improve the technical field of determining the efficiency of blocking policies. By determining a number of secondary tracking attempts avoided by blocking a primary tracking domain from loading in a host web page, the efficiency of blocking policies enforced by blocking application can be recognized.

FIG. 4 illustrates an example computer system 400 that may be employed in determining a number of secondary tracking attempts avoided by blocking a primary tracking domain from loading in a host web page. In some embodiments, the computer system 400 may be part of any of the systems or devices described in this disclosure. For example, the computer system 400 may be part of any of the user device 104, the rule server 106, the host server 108, the external server 110, the primary tracking server 112 and the secondary tracking servers 114a-114n of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the primary blocking application 118, the rule implementation application 120, and the rule generation application 122 of FIGS. 1 and 2, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the primary blocking application 118, the rule implementation application 120, and the rule generation application 122.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for determining a number of secondary tracking attempts avoided by blocking a primary tracking domain from loading in a host web page, at least a portion of the method being performed by a computing device comprising one or more processors, a memory, and an operating system stored within the memory, the computer-implemented method comprising:

receiving a set of rules that identify numbers of secondary tracking domains that are loaded into web browsers through host web pages by external domain and primary tracking domain combinations, wherein the set of rules are created based on attribute patterns exhibited by the external domain and primary tracking domain combinations, the set of rules including loading pattern rules based on loading patterns exhibited by the external domain and primary tracking domain combinations;

monitoring a first host web page accessed by a user device that loads content from a first external domain, wherein the first external domain is configured to load a first tracking domain and wherein the first external domain and the first tracking domain are among the external domain and primary tracking domain combinations for which attribute patterns were identified to create the set of rules;

applying a blocking policy to block the first tracking domain from loading;

identifying loading attributes of the first external domain and the first tracking domain;

based on the identified loading attributes, identifying a loading pattern rule within the set of rules to dynamically determine a number of first additional tracking domains whose attempts to load content into the first host web page are avoided by blocking the first tracking domain; and displaying the number of first additional tracking domains that would have attempted to load content into the first host web page if the first tracking domain had not been blocked.

2. The method of claim 1, wherein the set of rules also includes resource pattern rules that identify numbers of secondary tracking domains based on content types and size ranges of requests made by the external domain and primary tracking domain combinations.

3. The method of claim 2, further comprising:

monitoring a second host web page accessed by the user device that loads content from a second external domain, wherein the second external domain is configured to load a second tracking domain and wherein the second external domain and the second tracking domain are among the external domain and primary tracking domain combinations for which attribute patterns were identified to create the set of rules;

applying the blocking policy to block the second tracking domain from loading;

identifying resource attributes of the second external domain and the second tracking domain;

based on the identified resource attributes, identifying a resource pattern rule within the set of rules to dynamically determine a number of second additional tracking domains whose attempts to load content into the second host web page are avoided by blocking the second tracking domain; and displaying the number of second additional tracking domains that would have attempted to load content into the second host web page if the second tracking domain had not been blocked.

4. The method of claim 1, wherein the set of rules also includes parameter pattern rules that identify numbers of secondary tracking domains based on parameters in requests made by the external domain and primary tracking domain combinations.

5. The method of claim 4, further comprising:

monitoring a third host web page accessed by the user device that loads content from a third external domain, wherein the third external domain is configured to load a third tracking domain and wherein the third external domain and the third tracking domain are among the external domain and primary tracking domain combinations for which attribute patterns were identified to create the set of rules;

applying the blocking policy to block the third tracking domain from loading;

identifying parameter attributes of the third external domain and the third tracking domain;

based on the identified parameter attributes, identifying a parameter pattern rule within the set of rules to dynamically determine a number of third additional tracking domains whose attempts to load content into the third host web page are avoided by blocking the third tracking domain; and displaying the number of third additional tracking domains that would have attempted to load content into the third host web page if the third tracking domain had not been blocked.

6. The method of claim 1, wherein the set of rules also includes header pattern rules that identify numbers of secondary tracking domains based on headers on requests made by the external domain and primary tracking domain combinations.

7. The method of claim 6, further comprising:

monitoring a fourth host web page accessed by the user device that loads content from a fourth external domain, wherein the fourth external domain is configured to load a fourth tracking domain and wherein the fourth external domain and the fourth tracking domain are among the external domain and primary tracking domain combinations for which attribute patterns were identified to create the set of rules;

applying the blocking policy to block the fourth tracking domain from loading;

identifying header attributes of the fourth external domain and the fourth tracking domain;

based on the identified header attributes, identifying a header pattern rule within the set of rules to dynamically determine a number of fourth additional tracking domains whose attempts to load content into the fourth host web page are avoided by blocking the fourth tracking domain; and displaying the number of fourth additional tracking domains that would have attempted to load content into the fourth host web page if the fourth tracking domain had not been blocked.

8. One or more non-transitory computer-readable media comprising one or more computer-readable instructions that, when executed by one or more processors of a computing device, cause the computing device to perform a method for determining a number of secondary tracking attempts avoided by blocking a primary tracking domain from loading in a host web page, the method comprising:

receiving a set of rules that identify numbers of secondary tracking domains that are loaded into web browsers through host web pages by external domain and primary tracking domain combinations, wherein the set of rules are created based on attribute patterns exhibited by the external domain and primary tracking domain combinations, the set of rules including resource pattern rules that identify numbers of secondary tracking domains based on content types and size ranges of requests made by the external domain and primary tracking domain combinations;

monitoring a first host web page accessed by a user device that loads content from a first external domain, wherein the first external domain is configured to load a first tracking domain and wherein the first external domain and the first tracking domain are among the external domain and primary tracking domain combinations for which attribute patterns were identified to create the set of rules;

applying a blocking policy to block the first tracking domain from loading;

identifying a resource pattern rule within the set of rules to dynamically determine a number of first additional tracking domains whose attempts to load content into the first host web page are avoided by blocking the first tracking domain; and displaying the number of first additional tracking domains that would have attempted to load content into the first host web page if the first tracking domain had not been blocked.

9. The one or more non-transitory computer-readable media of claim 8, wherein the set of rules also includes loading pattern rules that identify numbers of secondary tracking domains based on loading patterns exhibited by the external domain and primary tracking domain combinations.

10. The one or more non-transitory computer-readable media of claim 9, further comprising:

monitoring a second host web page accessed by the user device that loads content from a second external domain, wherein the second external domain is configured to load a second tracking domain and wherein the second external domain and the second tracking domain are among the external domain and primary tracking domain combinations for which attribute patterns were identified to create the set of rules;

applying the blocking policy to block the second tracking domain from loading;

identifying a loading pattern rule within the set of rules to dynamically determine a number of second additional tracking domains whose attempts to load content into the second host web page are avoided by blocking the second tracking domain; and displaying the number of second additional tracking domains that would have attempted to load content into the second host web page if the second tracking domain had not been blocked.

11. The one or more non-transitory computer-readable media of claim 8, wherein the set of rules also includes parameter pattern rules that identify numbers of secondary tracking domains based on parameters in requests made by the external domain and primary tracking domain combinations.

12. The one or more non-transitory computer-readable media of claim 11, further comprising:

monitoring a third host web page accessed by the user device that loads content from a third external domain, wherein the third external domain is configured to load a third tracking domain and wherein the third external domain and the third tracking domain are among the external domain and primary tracking domain combinations for which attribute patterns were identified to create the set of rules;

applying the blocking policy to block the third tracking domain from loading;

identifying a parameter pattern rule within the set of rules to dynamically determine a number of third additional tracking domains whose attempts to load content into the third host web page are avoided by blocking the third tracking domain; and displaying the number of third additional tracking domains that would have attempted to load content into the third host web page if the third tracking domain had not been blocked.

13. The one or more non-transitory computer-readable media of claim 8, wherein the set of rules also includes header pattern rules that identify numbers of secondary tracking domains based on headers on requests made by the external domain and primary tracking domain combinations.

14. The one or more non-transitory computer-readable media of claim 13, further comprising:

monitoring a fourth host web page accessed by the user device that loads content from a fourth external domain, wherein the fourth external domain is configured to load a fourth tracking domain and wherein the fourth external domain and the fourth tracking domain are among the external domain and primary tracking domain combinations for which attribute patterns were identified to create the set of rules;

applying the blocking policy to block the fourth tracking domain from loading;

identifying a header pattern rule within the set of rules to dynamically determine a number of fourth additional tracking domains whose attempts to load content into the fourth host web page are avoided by blocking the fourth tracking domain; and displaying the number of fourth additional tracking domains that would have attempted to load content into the fourth host web page if the fourth tracking domain had not been blocked.

15. A computing device comprising:

one or more processors; and one or more non-transitory computer-readable media comprising one or more computer-readable instructions that, when executed by the one or more processors, cause the computing device to perform a method for determining a number of secondary tracking attempts avoided by blocking a primary tracking domain from loading in a host web page, the method comprising:

receiving a set of rules that identify numbers of secondary tracking domains that are loaded into web browsers through host web pages by external domain and primary tracking domain combinations, wherein the set of rules are created based on attribute patterns exhibited by the external domain and primary tracking domain combinations, the set of rules including parameter pattern rules based on parameters in requests made by the external domain and primary tracking domain combinations;

monitoring a first host web page accessed by a user device that loads content from a first external domain, wherein the first external domain is configured to load a first tracking domain and wherein the first external domain and the first tracking domain are among the external domain and primary tracking domain combinations for which attribute patterns were identified to create the set of rules;

applying a blocking policy to block the first tracking domain from loading;

identifying a parameter pattern rule within the set of rules to dynamically determine a number of first additional tracking domains whose attempts to load content into the first host web page are avoided by blocking the first tracking domain; and displaying the number of first additional tracking domains that would have attempted to load content into the first host web page if the first tracking domain had not been blocked.

16. The computing device of claim 15, wherein the set of rules also includes resource pattern rules that identify numbers of secondary tracking domains based on content types and size ranges of requests made by the external domain and primary tracking domain combinations.

17. The computing device of claim 16, further comprising:
monitoring a second host web page accessed by the user device that loads content from a second external domain, wherein the second external domain is configured to load a second tracking domain and wherein the second external domain and the second tracking domain are among the external domain and primary tracking domain combinations for which attribute patterns were identified to create the set of rules;
applying the blocking policy to block the second tracking domain from loading;
identifying a resource pattern rule within the set of rules to dynamically determine a number of second additional tracking domains whose attempts to load content into the second host web page are avoided by blocking the second tracking domain; and
displaying the number of second additional tracking domains that would have attempted to load content into the second host web page if the second tracking domain had not been blocked.

18. The computing device of claim 15, wherein the set of rules also includes loading pattern rules that identify numbers of secondary tracking domains based on loading patterns exhibited by the external domain and primary tracking domain combinations.

19. The computing device of claim 18, further comprising:
monitoring a third host web page accessed by the user device that loads content from a third external domain, wherein the third external domain is configured to load a third tracking domain and wherein the third external domain and the third tracking domain are among the external domain and primary tracking domain combinations for which attribute patterns were identified to create the set of rules;
applying the blocking policy to block the third tracking domain from loading;
identifying a loading pattern rule within the set of rules to dynamically determine a number of third additional tracking domains whose attempts to load content into the third host web page are avoided by blocking the third tracking domain; and
displaying the number of third additional tracking domains that would have attempted to load content into the third host web page if the third tracking domain had not been blocked.

20. The computing device of claim 15, wherein the set of rules also includes header pattern rules that identify numbers of secondary tracking domains based on headers on requests made by the external domain and primary tracking domain combinations and wherein the method further comprises:
monitoring a fourth host web page accessed by the user device that loads content from a fourth external domain, wherein the fourth external domain is configured to load a fourth tracking domain and wherein the fourth external domain and the fourth tracking domain are among the external domain and primary tracking domain combinations for which attribute patterns were identified to create the set of rules;
applying the blocking policy to block the fourth tracking domain from loading;
identifying a header pattern rule within the set of rules to dynamically determine a number of fourth additional tracking domains whose attempts to load content into the fourth host web page are avoided by blocking the fourth tracking domain; and
displaying the number of fourth additional tracking domains that would have attempted to load content into the fourth host web page if the fourth tracking domain had not been blocked.

* * * * *